A. P. ANDERSON.
ART OF TREATING AND DRYING STARCH.
APPLICATION FILED OCT. 14, 1907.
1,035,832.
Patented Aug. 20, 1912.
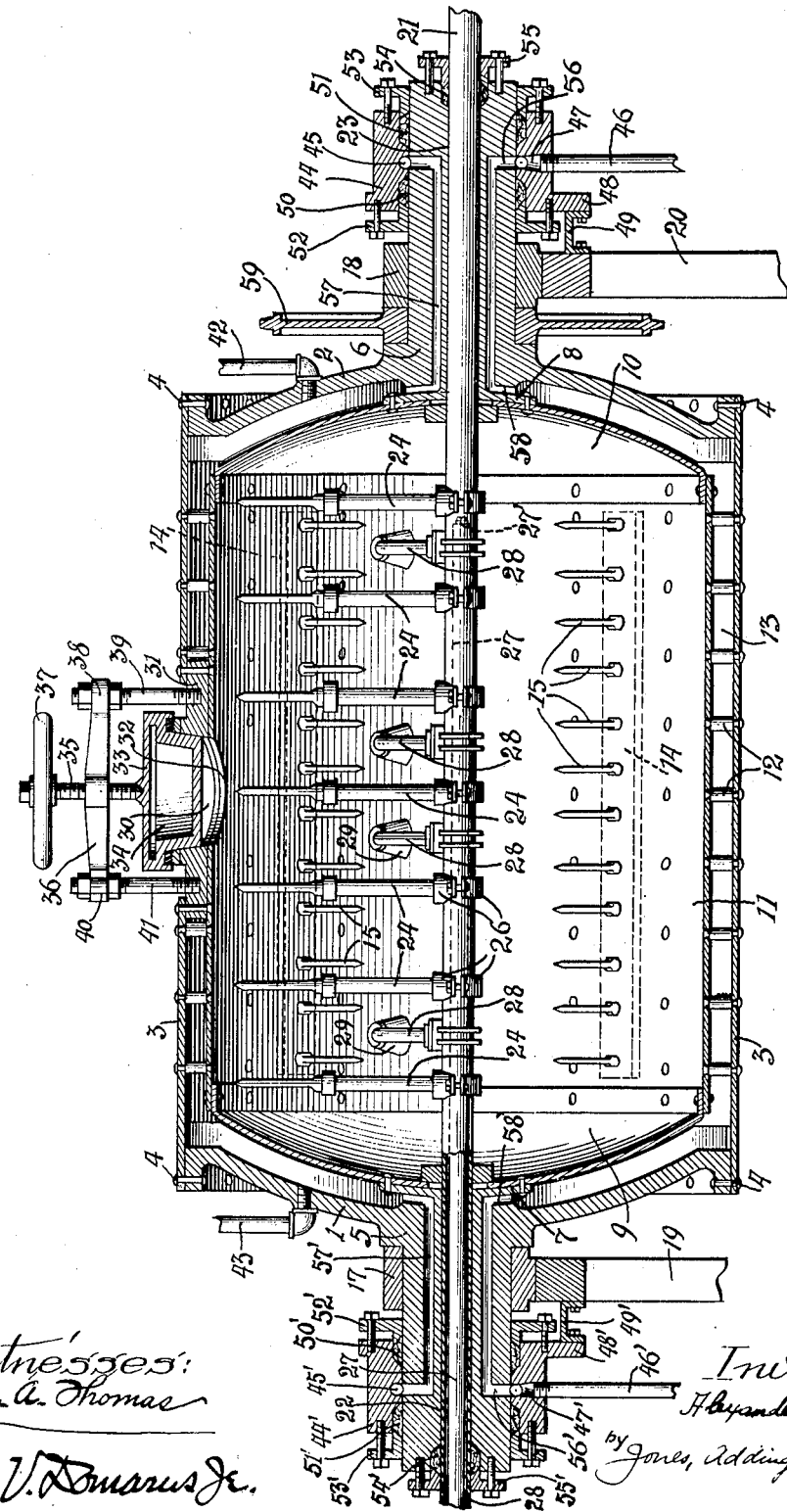

UNITED STATES PATENT OFFICE.

ALEXANDER P. ANDERSON, OF CHICAGO, ILLINOIS.

ART OF TREATING AND DRYING STARCH.

1,035,832.

Specification of Letters Patent. Patented Aug. 20, 1912.

Application filed October 14, 1907. Serial No. 397,323.

*To all whom it may concern:*

Be it known that I, ALEXANDER P. ANDERSON, a citizen of the United States, residing at Chicago, in the county of Cook and State of Illinois, have invented new and useful Improvements in the Art of Treating and Drying Starch, of which the following is a full, clear, concise, and exact description, reference being had to the accompanying drawing, forming a part of this specification.

My invention relates to an improvement in the art of treating and drying starches of all kinds, and has for its object a method of producing what I term "pebbled starch".—that is, starch in lumps of nodular or pebble-like form.

The subject-matter of this application relates to a species of the generic invention described and claimed in my application filed August 31, 1906, Serial No. 332,804.

My process comprises two steps, the first of which consists in subjecting the wet starch, containing a large percentage of moisture, to pressure above atmospheric, while being heated and tumbled inside a rotating air-tight drum, until all of the starch is formed into nodular or pebble-like lumps. The second step consists in drying the pebble-like or nodular starch-like lumps thus formed by creating a vacuum within the drum or cooker.

One preferred form of complete apparatus for carrying out the above process is fully described in my co-pending application, Serial No. 397,324, filed October 14, 1907.

In the drawing accompanying this specification is illustrated a longitudinal sectional view of a suitable form of cooker, showing the interior construction of the same, as well as the connections for passing a heating or cooking fluid through the cooker-jacket.

The drum or cylinder (conveniently termed the "cooker") comprises a pair of end heads 1 and 2, preferably of heavy cast metal, to which is secured the outer cylindrical section 3 by means of rivets 4. The section 3 and the end heads 1 and 2 constitute the outer shell. The end head 1 is provided with a hub 5, while the end head 2 is provided with a similar hub 6. The inner ends of these hubs have peripheral flanges or shoulders 7 and 8, to which are riveted the end members 9 and 10, respectively. To these end members is secured the inner cylindrical section 11 spaced from the outer section by stay-bolts 12. The section 11 and its end members 9 and 10 constitute the inner shell. There is thus formed a space or jacket 13 which surrounds the inner shell of the cooker. The inner shell has attached thereto upon its outer surface a series of ribs or strips 14 to which are secured the cutter— or stirrer—pipes 15 to communicate with the jacket. It will be noticed that the free ends of these pipes are closed, so that any heating or cooling fluid admitted into the jacket will enter said pipes without passing therethrough. These pipes may be flattened in a plane transverse to the longitudinal axis of the cooker for the purpose of cutting or breaking large lumps of the material that may be rolled against said flattened edges during the rotation of the cooker. Of course, the configuration of these pipes may be varied at will; ordinary round pipes may be used, in which case they might do little or no cutting, but they would stir the material during rotation of the cooker just as effectively as the flattened pipes. The number of these pipes in a row, as well as the number of rows, is purely a matter of choice.

The cooker is rotatably supported by the hubs 5 and 6 in suitable bearing-blocks 17 and 18 mounted on standards 19 and 20. Passing longitudinally through the cooker is a stationary central pipe 21 which rests snugly in bores 22 and 23 in the hubs 5 and 6, without interfering with the free rotation of the hubs. To the central pipe 21 within the cooker is attached a series of pipes 24 which I call the breaker-pipes. These breaker-pipes are, like the stirrer-pipes 13, closed at their free ends and may be of any suitable construction,—such as cylindrical throughout their entire length. Suitable clamps 26 may be employed for rigidly securing the breaker-pipes to the central pipe, into the upper parts of which clamps the pipes are screwed to communicate with the interior of the central pipe. In this way any heating or cooling fluid admitted into the said central pipe will enter the breaker-pipes without passing therethrough.

A second pipe 27 is concentrically arranged within the central pipe 21, being fastened thereto so as to rotate therewith, and is sufficiently smaller in diameter to leave a space 28 between the pipes. Communicating with the interior of the pipe 27 are the exhaust pipes 28, rigidly secured in position on the central pipe 21 in any preferred way.

These exhaust pipes are open at their outer ends to establish connection between the interior of the cooker and the interior of the pipe 27.

The inner end of the pipe 27 is closed beyond the last exhaust pipe, as indicated at 27', while the other end is adapted to be connected to a vacuum and condensing pump, whereby the interior of the cooker may be exhausted to the desired degree of vacuum. It will be noticed that the pipes 28 are set back at an angle relative to the breaker-pipes 24. The object of this angular displacement of the pipes 24 and 28 on the central pipe 21 is to keep the free ends of the pipes 28 clear of the material under treatment when the breaker-pipes 24 are turned down into the material in a direction toward the observer, for breaking up any masses that are too large to pass between the pipes 15 and 24. When the breaker-pipes 24 are thus turned down into the material, the pipes 28 will remain clear of the same, and will not, therefore, be in danger of having the openings in their free ends clogged. As a further prevention of such clogging it may be desirable to provide the free ends of these pipes with hoods 29.

Access to the interior of the cooker is afforded through an opening or man-hole 30 in the casting 31, said man-hole being in alinement with the opening 32 in the inner shell. An effective way of securing the casting to the cooker is to rivet or bolt the same to the shells in the space or jacket therebetween. In the instance shown the lid 33 is hollow as indicated at 34,— that is to say, it is provided with a passage whereby a suitable heating or cooling fluid may be admitted into the lid for the purpose of heating or cooling the same (as the case may be). The lid is pivotally mounted on the cooker and is held in closed or sealed position by a central member 35 adjustably carried (as, by screw-threading) in the cross-bar 36. A hand-wheel 37 permits ready adjustment of the member 35 either for moving it toward the lid to seal the same, or for raising it out of engagement with the lid to permit opening of the same. The cross-bar 36 is pivoted at one end 38 to the upright member 39 screwed into the casting 31. The other end 40 of the cross-bar 36 is slotted to engage the upright member 41 likewise screwed into the casting. When it is desired to open the lid it is only necessary to raise the central member 37 out of engagement with the lid, whereupon the cross-bar 36 may be swung aside on its pivot out of the path of the lid. By connecting the pipes 42 and 43 (which communicate with opposite sides of the jacket) with the passage in the lid, some of the heating or cooling fluid may be by-passed around the jacket through the lid.

I shall now describe the connections whereby any suitable heating or cooling fluid may be passed through the jacket. The stuffing-box 44 is provided with a circular groove 45, forming what might be termed a steam-space. To the lower portion of the stuffing-box is secured a pipe 46, adapted to be connected with a source of fluid-supply, such as steam. The radial opening 47, into which this pipe is secured in the stuffing-box, communicates with said steam space. Although the pipe 46 and its connections might be sufficient to prevent rotation of the stuffing-box, I positively forestall any such possible rotation by connecting the flange 48 on the stuffing-box with the standard 20 by means of a brace or bracket 49. The packings 50 and 51 are held in place by the glands 52 and 53, respectively, secured to the stuffing-box. The packing 54 at the extreme end of the hub 6 is held in place by the gland 55 secured to the hub. The radial passages 56 in the hub are in alinement with the space 45 so as to communicate therewith. At their inner ends these radial passages communicate with the longitudinal openings 57 in the hub. These longitudinal openings in turn connect with the radial passages 58 formed in that portion of the end head 2 which projects into the jacket.

The above described arrangement at the right of the figure for the admission of a suitable heating or cooling fluid through the hub 6 into the jacket 13, is substantially duplicated at the left of the figure to permit the exit of the heating or cooling fluid from the jacket through the hub 5. For this reason I deem it quite unnecessary and superfluous to reiterate in detail the said arrangement at the left of the figure, whereby the heating or cooling fluid is allowed to escape from the jacket. All that need be said with reference to the description of said arrangement at the left of the figure is that the parts numbered 44 to 58 inclusive, as set forth in the immediately preceding paragraph, are for convenience shown in duplicate at the left of the figure and numbered, respectively, 44' to 58' inclusive.

Having thus described the structure of the cooker together with the arrangement for passing a heating or cooling fluid through the jacket I shall now direct attention to the operation of the device.

A sufficient amount of the material desired for treatment is put into the cooker, whereupon the latter is sealed air-tight by a suitable lid. The cooker is then set in rotation by connecting it with a source of power through the gear-wheel 59 rigidly secured to one of the hubs. At the same time a heating fluid, such as steam, is turned into the jacket, entering hub 6 through pipe 46, and passing out of the jacket through hub 5 into the drain or return pipe 46. The steam is also fed into the central pipe 21 from the right through suitable connections leading to the source of supply. Bearing in mind the arrangement of the stirrer-pipes 15 and the breaker-pipes 24, it will be apparent that the steam in the jacket enters the stirrer-pipes to heat the same uniformly with the entire inner surface of the cooker, and that the steam passing through the central pipe 21 enters the breaker-pipes, whereby the same become heated uniformly with the stirrer-pipes and the inner surface of the cooker.

During the rotation of the cooker the material is continually rolled and tumbled about, the presence of the stirrer-pipes 15 increasing the agitation of the material. In case it is desired to positively break up large lumps, the central pipe 21 is rotated in a direction toward the observer. Such rotation may be effected by a lever of some kind clamped to the central pipe. Although I have shown the stirrer-pipes 15 in pairs, with the breaker-pipes arranged to enter the space between each pair of stirrer pipes, any desired arrangement of the two sets of pipes may be employed. Therefore, with the breaker-pipes turned into the tumbling material, any masses or lumps too large to pass in between the movable stirrer-pipes and the stationary breaker-pipes, will be crushed or broken. By this means the material is broken up into pieces more or less uniform in size. Should it be desired to subject the interior of the cooker to pressure below atmospheric, it is only necessary to open communication between pipe 27 and a vacuum pump.

Having thus briefly described one form of suitable apparatus for accomplishing the various steps of my process, I shall now proceed to set forth in detail the preferred manner of carrying my method into effect: A known quantity of wet starch having about 50% of total moisture is put into the cooker-chamber to fill the same from one-third to one-half. The closure of the cooker being sealed air-tight, rotation of the cooker is begun. At the same time a steam-pressure of about 1 to 15 pounds is fed into the jacket, the stirrer-pipes, the stationary central pipe and the breaker-pipes. During the rotation of the cooker, the starch is tumbled and rolled about continuously, so that soon after the starting of the operation it begins to gelatinize and form itself into masses of varying sizes. The temperature of the starch increases until 100° C. are reached. At this stage, pressure and steam begin to form out of the moisture of the starch.

Inasmuch as the temperature of the steam-atmosphere within the cooker is naturally higher than that of the starch, a condensation of moisture takes place on and throughout the material which in gelatinizing becomes sticky, so that the starch-granules and particles begin to stick together to form nuclei or centers. In rolling and tumbling these nuclei or minute starch-masses grow in size by the accretion of other granules, so that the whole starchy mass within soon becomes converted into lumps which due to their mode of growth and to their continuous tumbling and rolling about, have become worn into pebble-like forms, presenting a glazed and polished surface. At about this point the breaker-pipes are turned down into the tumbling starch in order to break any masses that are too large to pass in between the stationary breaker-pipes and the moving stirrer-pipes. The heating of the starch now in the form of pebble-like lumps, is continued until a pressure of about 15 pounds per square inch develops within the cooker. This pressure is then blown off to atmospheric and exhausted until a vacuum of about 27 inches of mercury is created. This blow-off may be into the air, or sewer, or through the condenser of the vacuum-pump. It will be understood that, by thus maintaining within the cooker a pressure below that of the atmosphere, the starch-pebbles are rapidly deprived of their excess of moisture. The drying is continued with 1 to 15 pounds or more of steam in the jacket until the pebbles are preferably in an air-dry condition, when the operation is completed and the starch taken out. The pebbled lumps will be found to be more or less completely gelatinized, the degree of gelatinization depending upon the pressure to which they were subjected during their formation. They are, however, sufficiently gelatinized to be insoluble in water.

Certain of the details accompanying the steps as above given may be preferably varied in instances like the following: Known quantities of wet and of dry starch in clean condition and of known moisture-percentages, are mixed together so as to bring the resultant total moisture of the mixture down to about 40%; or, wet starch of about 50% of moisture is dried down to a total moisture of about 40% by any convenient method,—e. g., by kiln-drying, pressing, exposing to the air, or by means of the partial vacuum created in the cooker as above described. This starch containing about 40% of total moisture is now squeezed or run through a sieve or netting fine enough to break up any lumps that might be present in the starch, as well as to remove any impurities (such as gluten lumps, or the like) which will not pass through the sieve or netting as readily as the soft, granular starch. A sieve with holes of about one-tenth to one-fifth of an inch in diameter has been found to answer the purpose well, and to distribute the moisture of the starch evenly throughout the whole mass, leaving the same in a light, soft and fluffy condition. Enough of this starch is now put into the cooker which is then sealed and started rotating. The heating of the tumbling and rolling starch is also begun by keeping a pressure of about 1 to 15 pounds of steam on the jacket, and is continued until a pressure of about fifteen pounds develops within the cooker. As a rule, it is not necessary to turn the breaker-pipes down into the tumbling starch to break up any large masses or lumps, for the reason that the fluffy condition of the starch when put into the cooker has caused the starch to form into pebble-like lumps of great uniformity in size. The pressure in the cooker is now blown off and a vacuum created to dry the starch. The drying is continued with 1 to 15 pounds or more of steam on the jacket until the pebbled starch—lumps are preferably in an air-dry condition. The operation being now completed, the starch is taken out. The product hereby obtained is the same as the product of the treatment above described. In other words, the product resulting from the method herein disclosed and claimed consists of hard and horny pebble-like starch-lumps insoluble in water and gelatinized to such an extent that a complete fusion and coalescence of the granules have taken place. This product has the characteristics of the product set forth and claimed in my co-pending application Serial No. 332,807, filed August 31, 1906.

Of course, it is apparent that the heating of the cooker may be accomplished by means and ways other than the steam jacket, although this method of heating gives exceedingly satisfactory results. Furthermore, it is not essential that the apparatus herein described merely by way of illustration, be employed for the carrying-out of my process.

For the sake of clearness I will add that by the term "wet starch" as used in the appended claims, I mean starch containing from 40–50% moisture.

Having thus described my invention, what I claim as new and desire to secure by Letters Patent is:

1. The process of pebbling starch which consists in heating and tumbling wet starch in a closed receptacle until sufficient pressure develops within the same to start gelatinization of the starch, then continuing the heating and tumbling until the starch is practically completely gelatinized and until, due to the tumbling action, substantially all of the material has formed into pebble-like lumps, and then reducing the pressure below atmospheric to dry the starch-lumps down to the desired degree of moisture.

2. The process of pebbling starch which consists in heating and tumbling wet starch in a closed receptacle until sufficient pressure develops within the same to start gelatinization of the starch, then continuing the heating and tumbling until the starch is practically completely gelatinized and until, due to the tumbling action, substantially all of the material has formed into pebble-like lumps, and then reducing the pressure below atmospheric, under continued heating of the receptacle, to dry the starch-lumps to a substantially air-dry condition.

3. The process of pebbling starch which consists in heating and tumbling wet starch in a closed receptacle until a pressure of about 15 pounds per square inch develops within the same, whereby practically complete gelatinization is effected and substantially all of the material forms into pebble-like lumps, and then reducing the pressure below atmospheric to dry the starch-lumps to a substantially air-dry condition.

4. The process of pebbling starch which consists in heating and tumbling wet starch in a light uncompacted state in a closed receptacle until a pressure of about 15 pounds per square inch develops within the same to bring about practically complete gelatinization of the starch, whereby, due to the tumbling action, substantially all of the material forms into pebble-like lumps, and then reducing the pressure below atmospheric, under continued heating of the receptacle, to dry the starch to a substantially air-dry condition.

5. The process of pebbling starch which consists in heating and tumbling wet starch in a light uncompacted state in a closed steam-jacketed receptacle until sufficient pressure develops within the same to gelatinize the starch, then continuing the heating and tumbling until the starch is practically completely gelatinized and substantially all of the material forms into pebble-like lumps, and then reducing the pressure below atmospheric, with about 1 to 15 pounds of steam-pressure on the jacket, to dry the starch-lumps to a substantially air-dry condition.

6. The process of pebbling starch which consists in heating and tumbling wet starch in a light uncompacted state in a closed steam-jacketed receptacle until a pressure of about 15 pounds per square inch develops within the same, and continuing the heating until the starch becomes practically completely gelatinized, whereby, due to the tumbling action, substantially all of the material forms into pebble-like lumps, and then reducing the pressure below atmospheric, with about 1 to 15 pounds of steam-pressure on the jacket, to dry the starch to a substantially air-dry condition.

7. The process of pebbling starch which consists in reducing starch containing about 40 per cent. of total moisture to a soft and fluffy condition, then heating and tumbling the starch in a closed receptacle until sufficient pressure develops within the same to gelatinize the starch, then continuing the heating and tumbling until substantially all of the material becomes practically completely gelatinized and forms into pebble-like lumps, and then reducing the pressure below atmospheric to dry the starch-lumps to a substantially air-dry condition.

8. The process of pebbling starch which consists in reducing starch containing about 40 per cent. of total moisture to a soft and fluffy condition, then heating and tumbling the starch in a closed receptacle until sufficient pressure develops within the same to gelatinize the starch, then continuing the heating and tumbling until substantially all of the material forms into pebble-like lumps, and then reducing the pressure below atmospheric, under continued heating of the receptacle, to dry the starch-lumps to a substantially air-dry condition.

9. The process of pebbling starch which consists in reducing starch containing about 40 per cent. of total moisture to a soft and fluffy condition, then heating and tumbling the starch in a closed receptacle until a pressure of about 15 pounds per square inch develops within the same, and continuing the heating until the starch becomes practically completely gelatinized and whereby, due to the tumbling action substantially all of the material forms into pebble-like lumps, and then reducing the pressure below atmospheric, under continued heating of the receptacle, to dry the starch-lumps to a substantially air-dry condition.

10. The process of pebbling starch which consists in causing starch containing about 40 per cent. of total moisture to become soft and fluffy, then heating and tumbling the starch in a closed steam-jacketed receptacle until sufficient pressure develops within the same to gelatinize the starch, then continuing the heating and tumbling until substantially all of the material becomes practically completely gelatinized and forms into pebble-like lumps, and then reducing the pressure below atmospheric, with about 1 to 15 pounds of steam-pressure on the jacket, to dry the starch-lumps to a substantially air-dry condition.

11. The process of pebbling starch which consists in causing starch containing about 40 per cent. of total moisture to become soft and fluffy, then heating and tumbling the starch in a closed steam-jacketed receptacle until a pressure of about 15 pounds per square inch develops within the same, and continuing the heating until the starch becomes practically completely gelatinized, whereby due to the tumbling action substantially all of the material forms into pebble-like lumps, and then reducing the pressure below atmospheric, with about 1 to 15 pounds of steam-pressure on the jacket, to dry the starch-lumps to a substantially air-dry condition.

12. The process of pebbling starch which consists in heating and tumbling wet starch in a closed receptacle until sufficient pressure develops within the same to bring about gelatinization of the starch, and breaking up any large masses, then continuing the heating and tumbling until the material becomes practically completely gelatinized, and, due to the tumbling action, forms into lumps, and then reducing the pressure below atmospheric to dry the starch-lumps down to the desired degree of moisture.

In witness whereof, I have hereunto subscribed my name in the presence of two witnesses.

ALEXANDER P. ANDERSON.

Witnesses:
J. JAY SMITH,
LOUISE RAND BASCOM.